March 6, 1962 W. L. MORRISON 3,023,588
METHOD OF AND APPARATUS FOR CHILLING FOODSTUFFS AND THE LIKE
Filed Feb. 24, 1960 3 Sheets-Sheet 1

INVENTOR.
WILLARD L. MORRISON
BY PARKER & CARTER
ATTORNEYS

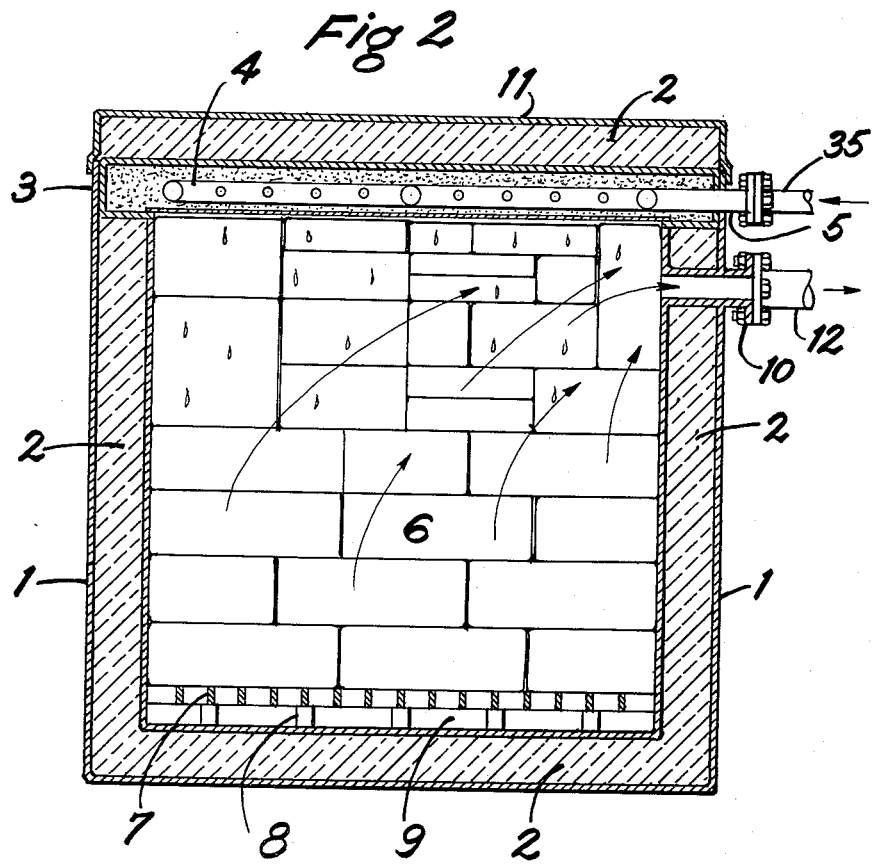
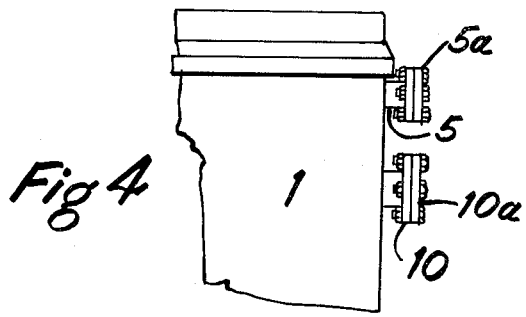

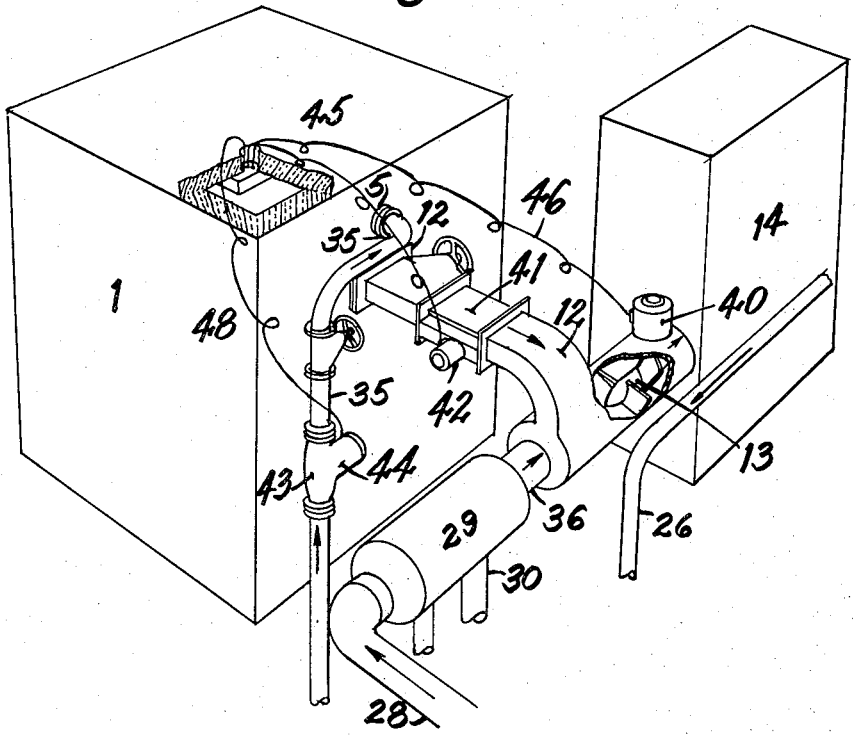

United States Patent Office 3,023,588
Patented Mar. 6, 1962

3,023,588
METHOD OF AND APPARATUS FOR CHILLING FOODSTUFFS AND THE LIKE
Willard L. Morrison, Lake Forest, Ill., assignor to Liquefreeze Company, Inc., New York, N.Y., a corporation of New York
Filed Feb. 24, 1960, Ser. No. 10,685
10 Claims. (Cl. 62—64)

My invention relates to a method of chilling for storage and shipment such perishable materials as foodstuffs.

One object of the invention is to chill the material, in the container in which it is to be stored or shipped, at atmospheric pressure by exposing the material to intimate contact with a cold boiling liquid, the boiling temperature of which at atmospheric pressure is lower than the temperature to which it is desired to chill the material, for example—liquid nitrogen which boils at —320 degrees F. and which can contact the material without deleterious effect.

I propose to pack the material, preferably though not necessarily in frozen condition, tightly enough in an insulated shipper container so that the material may be safely handled and shipped.

There will always be some clearance between the various packages or pieces or elements of the packed material but such clearance will be relatively small.

After the material has been packed, the cold boiling liquid will be poured into the container at substantially atmospheric pressure and the liquid will, as would any other liquid, penetrate into the spaces between the various elements or packages, even into the wrappers or cartons containing the material unless those wrappers or cartons are liquid-proof, which they habitually are not.

The latent heat necessary to boil the liquid will be supplied by the relatively warm contents of the container and the walls thereof. The container and contents will thus be rapidly cooled as a result of the absorption of heat by the liquid. The liquid as it boils will enter the gaseous phase, with expansion in volume and must be discharged from the shipper container.

This gas will be discharged from or drawn out of the container as rapidly as it it evolved and will be again liquefied and can be returned to the shipper container to continue the chilling operation in a continuous cycle.

Since I propose to rely primarily upon the heat of the material to provide the latent heat necessary to vaporize the liquid, relying to a very much less degree if at all on heat exchange between the gaseous phase and the contents of the container, I will withdraw the gas from the container as rapidly as possible. As a result there will be but a slight temperature drop in the gas between boiling and liquefaction.

Every time a new container is loaded to be chilled, it will contain some air which will mix with cold boiling liquid. The volume and weight of air in each container will be very much less than the volume and weight of the nitrogen circulated through the container. I propose to make no effort to remove or dispose of such air in connection with the circulation and liquefaction of the nitrogen. This will result in gradually diluting the nitrogen and the time may come when it will be necessary to purge the system of air.

Since I propose to deal solely with the liquefaction and circulation of the nitrogen, without reference to dilution, or separating out any diluent and since the gas will enter the liquefaction zone at a temperature but little above the liquefaction temperature, comparatively simple and inexpensive mechanism may be used.

A gas holder will float on the line between the shipper container and the liquefaction apparatus to compensate for any temporary variations between the rate at which the gas boils off from the liquid and the rate at which the gas is liquefied.

Dilution of the nitrogen, if necessary, may be avoided or corrected by wasting some of the gas evolved in a fresh container as chilling starts or by periodically renewing the charge of nitrogen in the system.

Other objects will appear from time to time throughout the specification and claims.

This application is a continuation in part of my copending application Serial No. 536,993, filed September 27, 1955, now abandoned.

My invention is illustrated more or less diagrammatically in the accompanying drawings, wherein—

FIGURE 2 is a section through a modified form of the shipper container;

FIGURE 3 is a diagrammatic view of part of the system;

FIGURE 4 is a side elevation of a portion of the shipper container.

Like parts are indicated by like characters throughout the specification and drawings.

Figure 1:
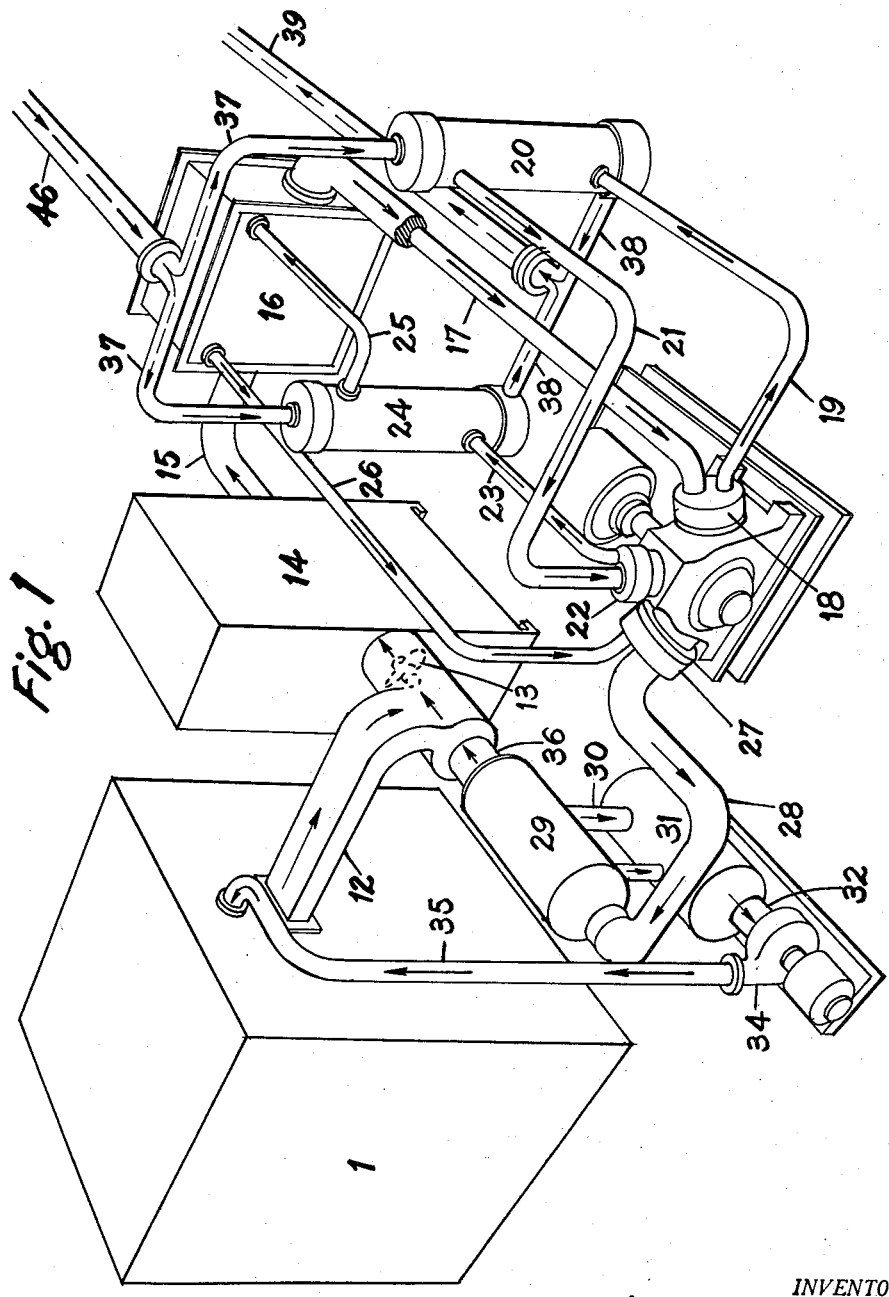
FIGURE 1 is a diagrammatic perspective view of the system.

1 is a shipper container having bottom and side walls insulated at 2. 3 is an absorptive drip pad generally coextensive with the container at the top thereof. 4 is a foraminous tubing grid embedded in the pad 3 which is adapted to be saturated by the cold boiling liquid supplied through duct 5 so that the liquid flows down over the material 6 to be chilled. 7 is an openwork grill floor supported above the container floor by supports 8 to provide a chamber 9 to receive any of the liquid flowing down below the material to be chilled. 10 is a gas outlet duct of material having low heat conductivity. 11 indicates a removable lid insulated at 2 which masks the pad 3 and which can close the container when the pad and grid are removed.

Gas in gaseous phase travels through a conduit 12 and may be impelled by a propeller 13 in the duct 12 for discharge into the gas holder 14. Gas is drawn through duct 15 from gas holder 14 into the gas to gas heat exchanger 16 where it takes up heat, then passes through the duct 17 to the first stage compressor 18. The compressed gas passes through the pipe 19 to water intercooler 20, then through duct 21 to second stage compressor 22. From there the gas goes through duct 23 to water after-cooler 24, duct 25 to gas to gas heat exchanger 16, where it is cooled, then through pipe 26 to the expander 27. The expanded cold gas having been further cooled by doing work, passes through the duct 28 to separator 29. The liquefied gas passes through the pipe 30 to the liquid collector 31, duct 32, liquid pump 34 to duct 35 connected to duct 5 of container 1 for contact with the material to be chilled.

The gas that is not liquefied, is separated from the liquid in the separator 29 passes through the duct 36 to join the duct 12 to again enter the gas holder 14. Thus the cold gas supplied to the gas to gas heat exchanger 16 from the shipper container and from the separator through ducts 12 and 36, gas holder 14 and duct 15 is used to cool the gas after it has been compressed in the second stage compressor and after the heat of compression has been extracted by the water intercooler 20 and water aftercooler 24 so that in the expander where the compressed, cooled gas expands and does work, the temperature will drop to the point at which liquefaction takes place.

The cooling water for the intercooler and aftercooler enters through the water pipe 46, branches 37 is discharged from the coolers through the branches 38 to drain pipe 39.

The mechanism above disclosed is a suitable mechanism for liquefying the gas which has boiled off from the liquid as a result of the heat absorbed or extracted from the contents of the shipper container. Any suitable liquefaction method and apparatus may be used. The particular apparatus illustrated is useful and satisfactory. Any apparatus which will take the cold gas as it is discharged from the shipper container at a temperature but little above the boiling point, because the gas escapes from the container at the same rate as it is vaporized and will reliquefy this cold gas so that the contents of the shipper container may again furnish the latent heat to vaporize the gas, is a suitable mechanism to carry out my invention.

The details of the mechanism illustrated and especially the details of the gas holder 14 and impeller 13 are not specifically illustrated as those details form no part of the present invention. The gas holder can adjust itself in the usual way to different quantities and pressures of gas and the amplifier 13 must be controlled and operated so as to insure that gas is fed to the gas holder from the shipper container at a rate such that pressure will not build up in the shipper container substantially above atmospheric or at least such that substantial pressure variations in the shipper container do not occur. While operation at atmospheric is desirable, the shipper container can be, if desired, maintained above or below atmospheric with success.

The impeller 13 may, if desired, be driven by a motor 40 to withdraw gas from the container 1 and discharge it into the gas holder 14. A valve 41 actuated by a motor 42 controls the discharge duct 12. A valve 43 controlled by a motor 44 controls the rate of flow of liquid through the duct 35. A pressurestat 45 within the shipper container 1 controls through connections 46, 47 and 48 the motors 40, 42 and 44. All three of these control members may be connected to work in unison or some of them may be omitted depending on the circumstances of use and the details of the operation. Suffice it to say that these mechanisms, some or all of them, will operate to maintain the pressure in the container substantially constant. I have shown a particular form of movable cover and a particular form of means for distributing the liquid in the shipper container. The details of cover and distribution manifold may be varied without departing from the spirit of my invention as any cover and any manifold may well be used.

The ducts 5 and 35, and 10 and 12 are flanged as indicated. The flanges may be held together by any suitable coupling for instance, nuts and bolts as shown in FIGURE 2. When the valves 43 and 42 are closed and the impeller 13 is not working as will be the case when any shipper container is disconnected from the system, the system will be closed against ingress of substantial quantities of air. The caps 5a and 10a may be used to close the ducts 5 and 10 when the container is disconnected, or if desired, the manifold 4 may be withdrawn.

The use and operation of my invention are as follows:

My system is charged with a cold boiling liquid, for example, nitrogen. The material to be chilled, preferably though not necessarily packed in cartons, boxes, cans or containers, and preferably though not necessarily frozen so as to be independent of the cartons or cans self-sustaining is packed in the insulated shipper container. The apparatus is connected to the shipper container. The liquid, perhaps nitrogen, which is not excessively expensive and has not deleterious effect on the foodstuffs is fed into the shipper container, and flows down around the packages in the shipper container, finally reaching the bottom of the container.

As the liquid flows along the surfaces of the material, the heat of the material even though frozen being far above the boiling point of nitrogen, will furnish the necessary latent heat to cause the liquid to boil without lowering the temperature of the liquid so the temperature gradient between the liquid and the material being chilled is reduced only as the contents of the container is cooled.

As the cold liquid boils, it expands many times and since the pressure in the container is maintained at a constant value, preferably atmospheric, the gas will pass out through the duct into the gas holder. The rate of gas travel from the point at which boiling occurs is so rapid that little time will be left for heat exchange between the material and the gas and the temperature of the gas will rise but little above the boiling point.

The gas holder is insulated, but little further rise in temperature will occur before the gas enters the gas to gas heat exchanger in the liquefaction system. I have illustrated two stages of compression. Under some circumstances a greater or less number of stages might be desirable. The water inter- and after-coolers are merely illustrative of the apparatus necessary to extract heat of compression. When the compressed gas having been cooled expands and does work, it will fall to a temperature at which some if not all of the gas will be vaporized. Of course, any gas that is not liquefied in the first pass will again be passed through the liquefaction system.

The temperature of the material being chilled may vary from load to load and will vary in the load as the temperature falls, and the surface exposed to contact with the liquid will vary dependent on the size, shape and arrangement of the packages. The rate of boiling, the rate of gas generation will vary. This makes necessary the gas holder which must be big enough to hold any excess gas when the rate of boiling is greater than the rate of liquefaction or vice versa.

When the cold boiling liquid is directly in contact with the material being chilled, cooling is done not by a large volume of gas but by a small volume of the liquid which absorbs heat with maximum rapidity as the latent heat to boil the cold liquid is extracted from the material being chilled.

The liquid will flow by gravity just like water even though boiling down along the boundaries between the food packages will penetrate through the paper or cardboard or wooden packages or cartons and will come in immediate contact with the foodstuffs or articles being cooled and it is not therefore necessary to provide any particular clearances to permit movement of the coolant into and circulation of the coolant around the packages.

I have not illustrated, because the details form no part of the invention, any means for charging or discharging the system with liquid nitrogen nor any means for permitting the escape of some of the gas from the shipper container in the initial stages of cooling to avoid dilution by air. Any suitable vent in the duct 12 and any suitable vent in the receiver 31 are all that are necessary.

When the contents of the shipper container have reached the desired chilling temperature, the liquefaction system will be disconnected and the duct 10 will be closed by any suitable closure which is a poor heat conductor and will permit escape of gas from the container if by chance any cold boiling liquid remains in the tank.

I claim:

1. The method of preserving perishable material for storage and shipment which consists in packing the material in frozen condition in an insulated container, closing the container and feeding liquid nitrogen into the container into direct contact wth the material, withdrawing the resultant gas from the container at a rate such that the pressure in the container remains substantially atmospheric, liquefying the cold gas withdrawn from the container and returning it at substantially atmospheric pressure to the container and continuing such cycle of supply, evaporation, withdrawal and reliquefaction until the contents of the container have reached the desired chilling temperature, then disconnecting the container for removal from the system leaving the system free for the connection of another container.

2. The method of preserving perishable material for storage and shipment which consists in packing the material in an insulated portable shipper container, closing the container and feeding liquid nitrogen into the container into direct contact with the material, withdrawing the resultant gas from the container at a rate such that the pressure in the container remains substantially constant, liquefying the cold gas withdrawn from the container and returning it at substantially the same pressure to the container and continuing such cycle of supply, evaporation, withdrawal and reliquefaction, until the contents of the container have reached the desired chilling temperature, then disconnecting the container for removal from the system, leaving the system free for the connection of another container.

3. A method of preparing perishable material in a container for storage and shipment, said method including the steps of directing liquid nitrogen at substantially atmospheric pressure against the perishable material, withdrawing the resultant nitrogen gas from the container at a rate sufficiently rapid to maintain substantially atmospheric pressure within the container, liquefying at least a portion of the nitrogen gas withdrawn from the container, returning at least a portion of the liquefied nitrogen gas at substantially atmospheric pressure to the container, and repeating the above cycle until the perishable material has reached a predetermined temperature.

4. A method of preparing perishable material in a container for storage and shipment, said method including the steps of exposing the perishable material at substantially atmospheric pressure to intimate contact with a cold boiling liquid having a boiling temperature, at substantially atmospheric pressure, which is lower than the temperature to which the perishable material is to be chilled, withdrawing the resultant gas from the container at a rate sufficiently rapid to maintain substantially atmospheric pressure within the container, liquefying at least a portion of the gas withdrawn from the container, returning at least a portion of the liquefied gas at substantially atmospheric pressure to the container, and repeating the above cycle until the perishable material has reached a predetermined temperature.

5. A method of chilling perishable material in a container, said method including the steps of exposing the perishable material to be chilled to a cold boiling liquid, the boiling temperature of the liquid, at atmospheric pressure, being lower than the temperature to which it is desired to chill the material, withdrawing the resultant gas from the container substantially as rapidly as it is evolved so as to maintain a substantially constant pressure within the container, liquefying at least a portion of the gas withdrawn from the container, returning at least a portion of the liquefied gas to the container at a rate sufficiently rapid to maintain a substantially constant pressure within the container, and repeating the above cycle until the perishable material has reached the desired low temperature.

6. A continuous method of chilling perishable material in a plurality of containers to a desired low temperature, said method including the steps exposing the perishable material to be chilled to a cold boiling liquid, the boiling temperature of the liquid, at atmospheric pressure, being lower than the temperature to which it is desired to chill the material, withdrawing the resultant gas from the containers substantially as rapidly as it is evolved so as to maintain a substantially constant pressure within the containers, liquefying at least a portion of the gas withdrawn from some or all of the containers, returning at least a portion of the liquefied gas to some or all of the containers at a rate sufficiently rapid to maintain a substantially constant pressure within each container to which liquefied gas is returned, and continuing the cycle for as long as necessary to bring the temperature of the material to the desired level.

7. A continuous method of chilling perishable material in a plurality of containers to a desired low temperature, said method including the steps of exposing the perishable material to be chilled to intimate contact with liquid nitrogen at substantially atmospheric pressure, withdrawing the nitrogen gas evolved and the residual gases, if any, in the containers substantially as rapidly as the nitrogen gas evolves so as to maintain a substantially constant pressure within the containers, liquefying at least a portion of the nitrogen gas withdrawn from some or all of the containers, returning at least a portion of the liquefied nitrogen ot some of all of the containers at a rate sufficiently rapid to maintain a substantially constant pressure within each container to which liquefied gas is returned, and continuing the above cycle for as long as necessary to bring the temperature of the perishable material to the desired level.

8. A system for chilling perishable material to a desired low temperature, said system including a container for chilling perishable material to a desired low temperature, a gas liquefaction system, means for connecting and disconnecting the container to the gas liquefaction system, means for charging the container with liquefied chilling gas from the system at a substantially constant pressure, and means for withdrawing vaporized chilling gas from the container at a rate sufficiently rapid to maintain the substantially constant pressure within the container.

9. The system of claim 8 further characterized in that the means for withdrawing vaporized chilling gas from the container includes a gas holder located in the connecting means between the container and liquefaction system, said gas holder having sufficient capacity to maintain a substantially constant pressure in the container.

10. The system of claim 9 further characterized in that the liquefaction system includes a liquefied gas collector from which liquefied gas enters the means connecting the container to the liquefaction system, and further including a duct connecting the liquefied gas collector to the gas holder, said duct being effective to divert refrigerant still in gaseous form in the collector back to the liquefaction system.

References Cited in the file of this patent

UNITED STATES PATENTS

| | | |
|---|---|---|
| 2,137,902 | Walter | Nov. 22, 1938 |
| 2,890,123 | Brown et al. | June 9, 1959 |
| 2,894,373 | Morrison | July 14, 1959 |